Figure 1:
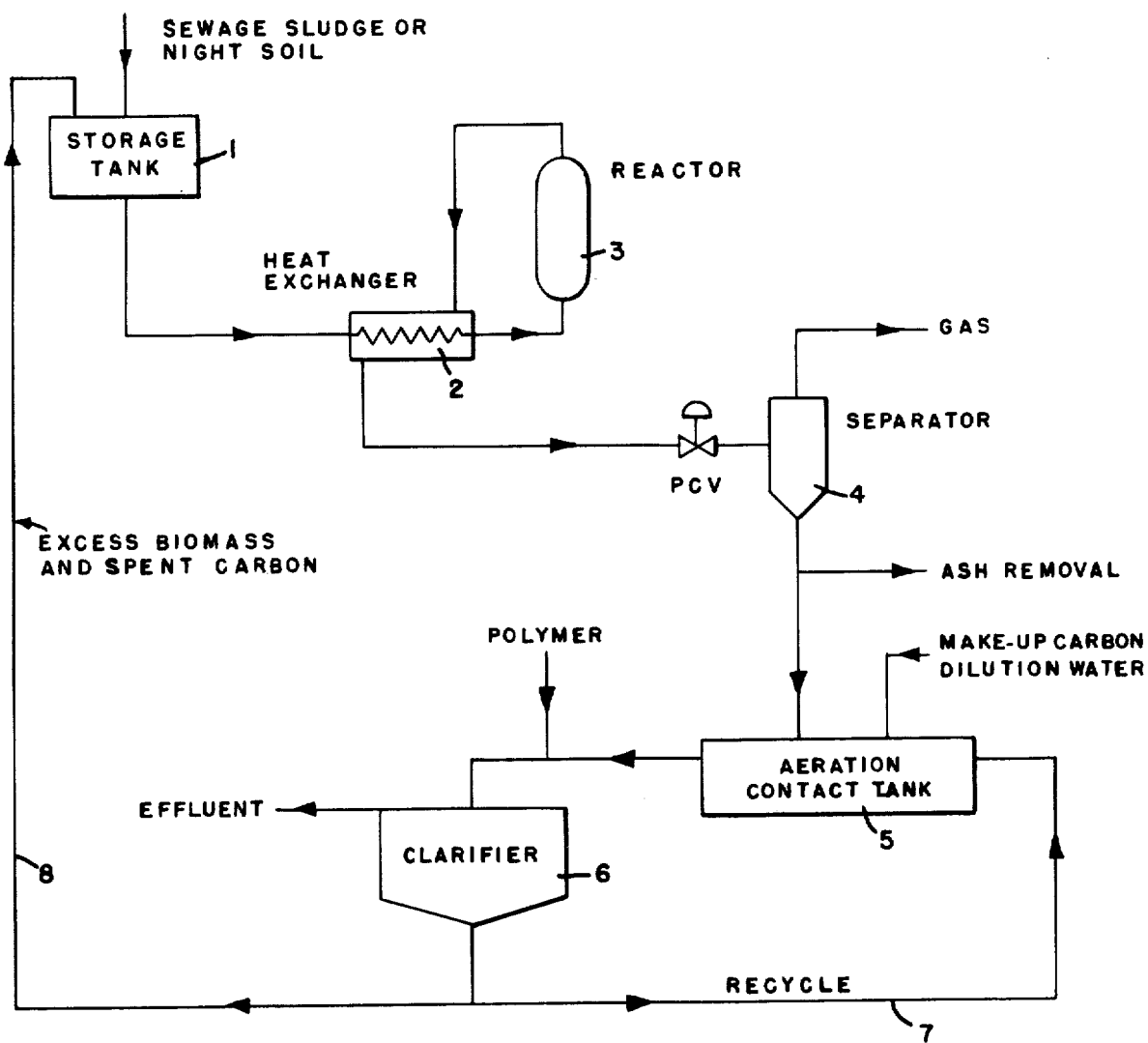
Figure 2:
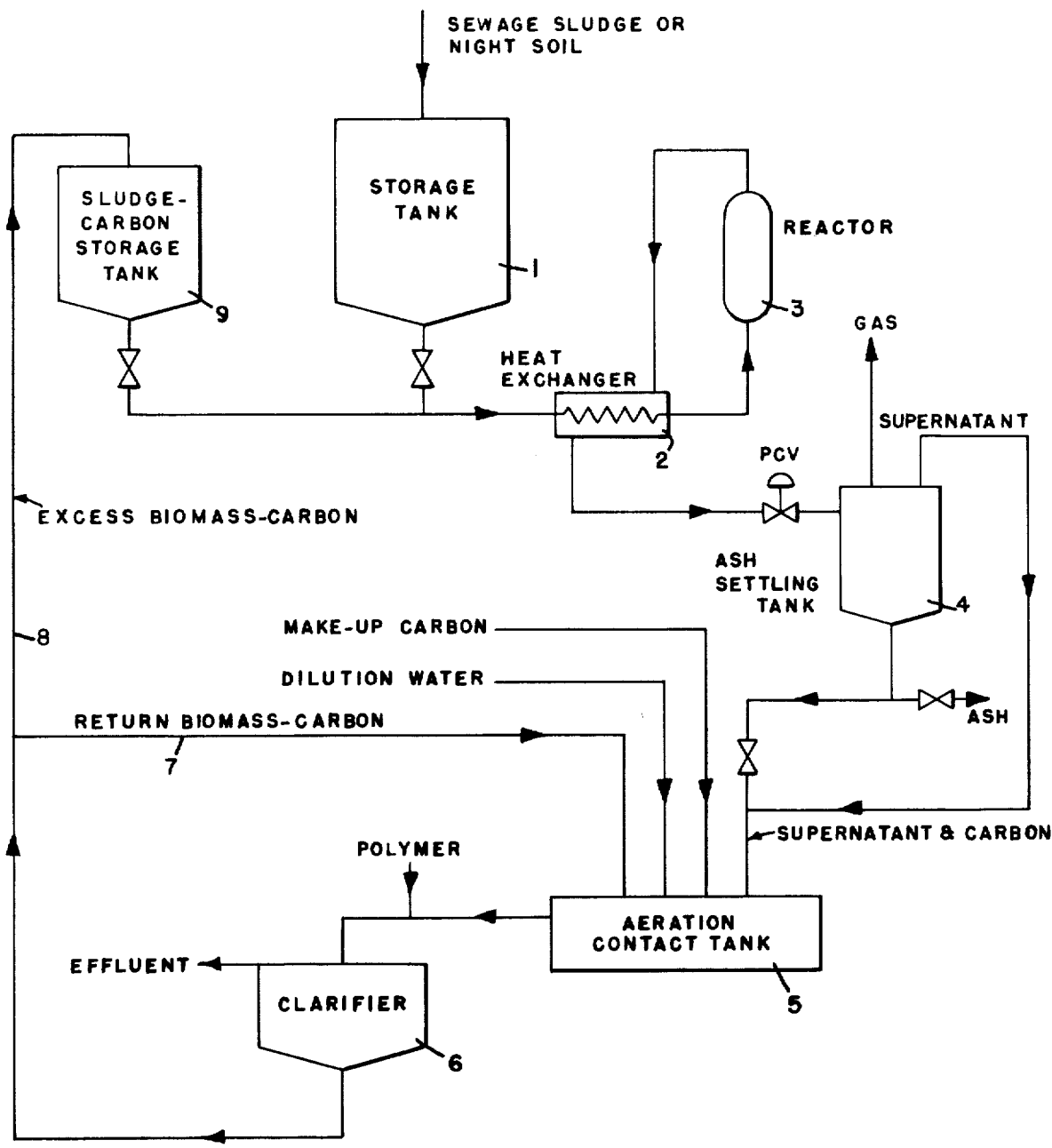

United States Patent [19]
Pradt et al.

[11] 3,876,536
[45] Apr. 8, 1975

[54] WASTE OXIDATION PROCESS

[75] Inventors: Louis A. Pradt, Wausau; John A. Meidl, Schofield, both of Wis.

[73] Assignee: Sterling Drug Inc., New York, N.Y.

[22] Filed: Apr. 24, 1973

[21] Appl. No.: 353,970

[52] U.S. Cl. ............ 210/10; 210/18; 210/40; 210/63; 210/71
[51] Int. Cl. .......... C02b 1/34; C02c 3/00
[58] Field of Search .......... 210/40, 63, 18, 10, 12, 210/17, 18, 71, 33, 67

[56] References Cited
UNITED STATES PATENTS
3,442,798  5/1969  Schoeffel et al. .......... 210/40
3,824,186  7/1974  Erickson et al. .......... 210/10 X

*Primary Examiner*—Thomas G. Wyse
*Attorney, Agent, or Firm*—Thomas L. Johnson; B. Woodrow Wyatt

[57] ABSTRACT

A process of treating sewage sludge or night soil by wet air oxidation, followed by biological oxidation of the liquid phase by aeration in the presence of biomass and powdered activated carbon.

3 Claims, 2 Drawing Figures

3,876,536

WASTE OXIDATION PROCESS

This invention relates to a waste oxidation process and more particularly is concerned with an improvement in the treatment of sewage sludge or night soil by wet air oxidation followed by biological oxidation.

Sewage sludge is derived from water-borne sewer systems fed by flush toilets, commonly used in the Western world. In Oriental countries, including Japan, flush toilets are nor ordinarily used; instead human waste, known as night soil, is allowed to collect in privy vaults, undiluted with water, and is periodically collected for disposal.

It is known to treat sewage sludge or night soil by wet air oxidation followed by biological oxidation in order to reduce the chemical oxygen demand (COD) and biochemical oxygen demand (BOD) to the point where the resulting solids and effluents can be disposed of without pollution of the environment; cf. Hurwitz, Teletzke and Gitchel, Wet Air Oxidation of Sewage Sludge, *Water & Sewage Works*, August 1965; and L. A. Pradt, Some Recent Developments in Night Soil Treatment, *Water Research*, Vol. 5, pp. 507–521 (1971) (Pergamon Press).

There are drawbacks to the known processes for oxidation of sewage sludge or night soil. The degree of wet oxidation, usually not more than about 70 percent, does not destroy color bodies; therefore, an objectionable color, approximately 500 American Public Health Association (APHA) units, remains in the treated effluent. Furthermore, obnoxious odors are generated in the aeration tank in which the biological oxidation takes place.

It has now been found that the addition of powdered activated carbon to the biological oxidation step, that is, the aeration tank, serves to remove the objectionable color and odors referred to above, and to improve the removal of COD and BOD from the waste effluent. Furthermore, the addition of the powdered activated carbon provides a system which requires less dilution water and can be adapted to provide nitrification and denitrification of the effluent.

In the drawings,

FIG. I represents one embodiment of the invention, and

FIG. II represents a further embodiment of the invention.

The operation of the new invention is carried out as follows with reference to the drawings. In the system set forth in FIG. I, the sewage sludge or night soil is supplied to a storage tank 1 whence it is transported in admixture with air through a heat exchanger 2 to a reactor 3 where the sludge or night soil is subjected to wet air oxidation. The wet air oxidation takes place between a temperature of 150° and 375°C. and at a pressure sufficient to maintain most of the water present in the liquid phase, i.e. between 150 and 4000 psig. The extent of oxidation preferably ranges between 30 and 70 percent reduction in COD. The reactor contents after oxidation are returned through the heat exchanger 2 and then passed to a separator 4 where the gas and liquid phases are separated. The liquid phase contains suspended solids such as sand, described as "ash." The ash is removed by settling and decanting the liquid, or by filtration, and the liquid sent on to an aeration contact tank 5 containing a biogrowth or biomass suitable to effect biological oxidation of the organic solutes present in the waste liquor. Powdered activated carbon in aqueous slurry is maintained in the aeration tank to the extent that the concentration of carbon is at least 500 parts per million and preferably in the range of 10,000 to 20,000 parts per million by weight. After a period of 10–150 hours of aerationcontacting, preferably about 50 hours, the liquid and biomass—carbon pass to a clarifier 6 where the mixture of powdered activated carbon and biomass settles to the bottom of the clarifier. A flocculating agent, preferably a cationic organic polymer may be added between the aeration tank and the final clarifier to enhance the settling characteristics of the stream. The biomass—carbon mixture collected in the clarifier is recycled back to the aeration tank 5 via the return sludge line 7.

The addition of the powdered activated carbon to the aeration vessel enhances the bio-oxidation taking place there and substantially reduces the odor and color of the waste liquors, the color being reduced to about 20 APHA units.

During operation of the process, excess biomass builds up in the system and the carbon becomes spent after its capacity for adsorption of influent COD-BOD has been reached. A further aspect of this invention resides in the concept of removing excess biomass and spent carbon from the clarifier 6 and transporting it through the excess sludge line 8 to the storage tank 1 where it is mixed with fresh sewage sludge or night soil and transported therewith to the wet air oxidation reactor. In this way the excess biomass is disposed of by oxidation and the spent carbon is regenerated. In this system where the carbon is recycled and regenerated, the liquid phase in separator 4 will contain a suspension of regenerated carbon and ash. The ash is preferably removed before the liquor containing the regenerated carbon is returned to the aeration tank. The ash removal can be accomplished by a centrifugal device which makes use of the difference in specific gravity between the ash and the regenerated carbon. If the amount of carbon added to the system is small, the carbon in the excess sludge can be oxidized completely or removed with the ash. Fresh, virgin carbon is added to make up the original weight as needed.

A still further aspect of this invention resides in the concept of treating the mixture of spent carbon and excess biomass from the biological oxidation step separately from the raw sewage slidge or night soil. Referring to FIG. II, excess biomass and spent carbon collected in clarifier 6 is transported via line 8 to a sludge-carbon storage tank 9. In this way it is possible to submit separately or intermittently to wet air oxidation the sewage sludge or night soil on the one hand, and the excess biomass—spent carbon mixture independently on the other. There are two outlets provided in the ash settling tank (separator 4). One outlet is for ash disposal and the other leads to the aeration tank 5. The ash disposal outlet is used when sewage sludge or night soil is being subjected to wet air oxidation. The outlet to the aeration tank is used when the reactor 3 is processing excess biomass and spent carbon since little or no ash is produced.

The system of the invention can provide, if desired, nitrification and denitrification of the oxidized waste liquor in order to remove ammoniacal nitrogen. Oxidation of the ammoniacal nitrogen to nitrite and nitrate occurs if the activated sludge age is sufficient to produce a population of nitrifying bacteria large enough to effect substantial nitrification. An average sludge age of at least three days is needed for this purpose. Nitification will therefore occur in the bio-oxidation aeration tank 5 provided the activated sludge age is at least 3 days. Denitrification is then carried out by passing the supernatant to an aerobic zone containing a source of organic carbon such as methanol, where the nitrate is reduced to elementary nitrogen and escapes as a gas.

The following examples will illustrate the invention without the latter being limited thereby.

EXAMPLE 1

78 Cubic meters of raw night soil having a COD of 35 g/l is collected and transferred to storage tank 1 of FIG. 1 or FIG. 11. The night soil is then oxidized in reactor 3, thereby reducing the COD to 15 g/l. The associated $BOD_5$ of the oxidized night soil is 8.5 g/l and the ammonia nitrogen content is 3.5 g/l.

The reactor contents are passed to separator 4, and the ash is selectively removed from the oxidized night soil. The liquid phase is passed to contact-aeration tank 5 containing a biomass and 630 kg of powdered activated carbon is added to the tank. The treated liquor and suspended solids are passed to clarifier 6 and the solids which settle there are recycled through sludge line 7 back to the aeration tank. Due to the biological nature of the treatment system 163 kg of excess biomass is produced.

After the carbon is spent, an amount of solid equivalent to the increased weight in the system (carbon plus excess biomass, 793 kg.) is removed from the clarifier 6 and transferred to storage tank 1 (FIG. I) or storage tank 9 (FIG. II). These combined solids are treated in oxidation reactor 3 either with additional night soil (FIG. I) or separately (FIG. II).

The regenerated carbon and the solubilized excess biomass are transferred to aeration tank 5 to begin another cycle.

The system effluent has a COD of 200 mg/l, a $BOD_5$ of 100 mg/l, an ammonia nitrogen content of 300 mg/l, and a color value of about 20 APHA units.

Without the addition of activated carbon in the flow schemes in FIG. I or FIG. II, the effluent COD, BOD and ammonia nitrogen would be about 2,000 mg/l, 350 mg/l and 1,000 mg/l, respectively, and the color value about 500 APHA units.

EXAMPLE 2

8,000 Gallons of raw primary sludge solids require treatment. The sludge characteristics are: COD = 50 g/l, $BOD_5$ = 20 g/l, percent solids = 3%. The primary sludge solids are transferred from storage tank 1, FIG. I or FIG. II to oxidation reactor 3 where the soluble COD and $BOD_5$ are reduced to 25 g/l and 15 g/l, respectively.

After oxidation, the primary ash is preferentially removed from the system. The liquid phase passes to contactaeration tank 5. At this point 955 lbs. of powdered activated carbon are added, and the system operated in accordance with the procedure of Example 1. Also, due to the biological nature of the system, biooxidation of remaining organics occurs generating 340 lbs. of excess biomass. After the carbon is spent, the combined 1,295 lbs. (955 + 340) solids increase is removed from clarifier 6 and transferred to storage tank 1, FIG. I or storage tank 9, FIG. II.

The spent carbon and excess biomass are then treated in oxidation reactor 3 to regenerate the carbon and solubilize the associated organic material. The solids can be treated either in combination with additional raw primary sludge (FIG. I) or separately (FIG. II).

The system effluent has a COD of 400 mg/l, a $BOD_5$ of 200 mg/l and an ammonia nitrogen content of 10 mg/l.

Without the addition of activated carbon in either flow scheme, effluent COD, $BOD_5$ and ammonia nitrogen would be 2,000 mg/l, 500 mg/l and 1,000 mg/l, respectively.

We claim:

1. In a process for treating raw sewage sludge or night soil by wet air oxidation at a temperature between 150° and 375°C. and a pressure between 150 and 4,000 psig so that a reduction of between 30 and 70 percent in chemical oxygen demand is obtained, separating the gaseous, liquid and solid phases from said oxidation, and biologically oxidizing the liquid phase in an aeration contact tank containing a biomass suitable to effect biological oxidation of the organic solutes present in said liquid phase; the improvement which comprises maintaining powdered activated carbon in the aeration contact tank in an amount sufficient to enhance the bio-oxidation and substantially reduce the odor and color of said liquid phase, carrying out the biological oxidation until excess biomass builds up and the activated carbon becomes spent, transferring a mixture of the excess biomass and spent carbon to a wet oxidation reactor, and oxidizing said mixture under conditions similar to those used for wet air oxidation of the raw sewage sludge or night soil so as to regenerate the powdered activated carbon for further use in the biological oxidation step and at the same time disposing of the excess biomass.

2. The process according to claim 1 in which the amount of powdered activated carbon present in the biological oxidation step is between 500 and 20,000 parts per million.

3. The process according to claim 1 in which the oxidation of the spent carbon and excess biomass is carried out in admixture with additional raw sewage sludge or night soil.

* * * * *